M. G. GRAHAM.
EXTENSION STOVE-PIPE.

No. 186,125. Patented Jan. 9, 1877.

Witnesses:
A. Ruppert,
R. Mann

M. G. Graham
Inventor.
D. P. Holloway & Co
Atty

UNITED STATES PATENT OFFICE.

MILES G. GRAHAM, OF HORNELLSVILLE, NEW YORK, ASSIGNOR OF TWO-THIRDS HIS RIGHT TO A. W. HUNT AND JOHN O. ADSIT, OF SAME PLACE.

IMPROVEMENT IN EXTENSION STOVE-PIPES.

Specification forming part of Letters Patent No. 186,125, dated January 9, 1877; application filed December 14, 1876.

*To all whom it may concern:*

Be it known that I, MILES G. GRAHAM, of Hornellsville, in the county of Steuben and State of New York, have invented a new and useful Improvement in Stove-Pipes, of which the following is a specification:

The object of this invention is to make a readily-adjustable stove-pipe joint, which shall at the same time be tight; and my improvement consists in making one joint somewhat smaller than the other, and turning out its edge so as to fit the inside of the larger joint, the end of the latter being slit so as to set down on the outer surface of the smaller pipe, the joint being completed by a slip-ring.

Figure 1:
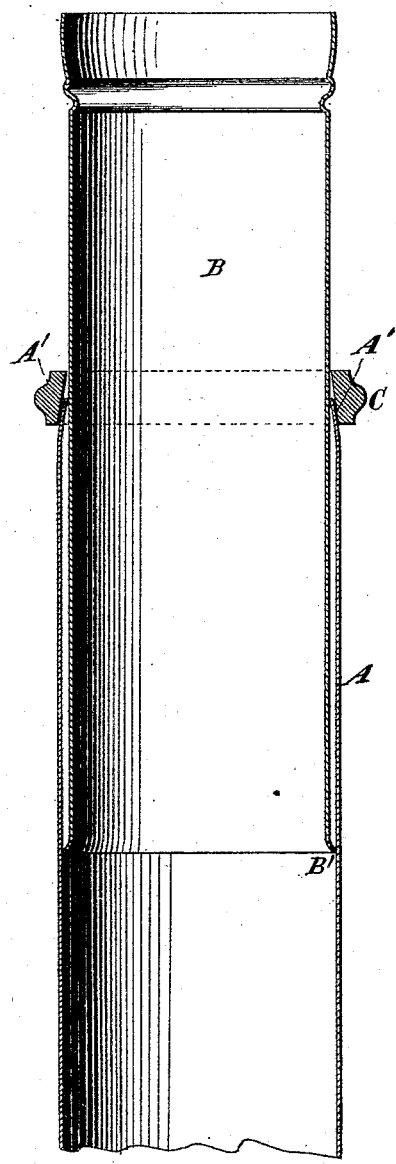
Figure 2:
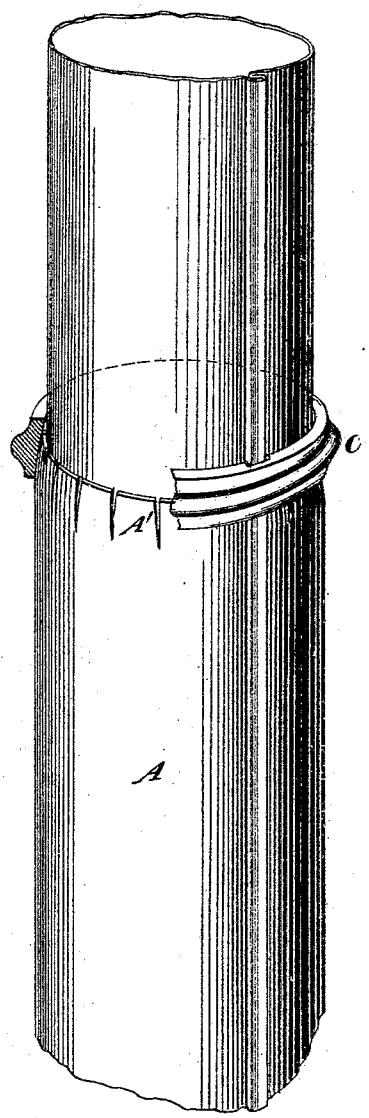

In the annexed drawings, making part of this specification, Figure 1 is a vertical central section, and Fig. 2 is an elevation, of the pipes forming the joint.

The same letters are employed in both figures in the indication of identical parts.

A is the section of larger diameter. In the end acute angular slits are cut out, leaving projections A', which are slightly curved inwardly, so as to fit snugly against the exterior surface of the interior and smaller pipe B. This pipe is cylindrical, except that at the end which is intended to be inserted into the pipe A it is slightly flared, so that when inserted its edge shall bear against the interior surface, to assist in making the joint tight, and to prevent the accumulation of rust and soot between the pipes.

When pipe B has been inserted to the proper distance, the joint is formed by slipping the ring C over the joint. This ring is made slightly flaring, so that it may ride over the inclined projections A', and compress them tightly upon the pipe B.

What I claim as my invention, and desire to secure by Letters Patent, is—

1. A stove-pipe formed of a section, A, having at the end the flexible projections A', a section, B, sliding into section A, and a slip-ring, C, for completing the joint, substantially as set forth.

2. In combination with an exterior section, A, with flexible projections A', and slip-ring C, for forming an exterior joint, the interior section B, having a flaring end at B', for forming an interior joint, substantially as set forth.

In testimony whereof I have signed my name to this specification in the presence of two subscribing witnesses.

MILES G. GRAHAM.

Witnesses:
D. P. HOLLOWAY,
A. RUPPERT.